United States Patent
Suzuki et al.

(10) Patent No.: US 9,430,015 B2
(45) Date of Patent: Aug. 30, 2016

(54) METHOD AND SYSTEM FOR SETTING POWER SUPPLY MODE OF A MULTIPLE-CORE PROCESSOR SYSTEM BASED ON CONDITION OF A TIME BIN DURING A NUMBER OF TIME INTERVALS WITHIN THE TIME BIN IS EQUAL TO OR LARGER THAN A SECOND THRESHOLD

(71) Applicant: FUJITSU LIMITED, Kawasaki-shi (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 423 days.

(21) Appl. No.: 13/654,863

(22) Filed: Oct. 18, 2012

(65) Prior Publication Data
US 2013/0047021 A1 Feb. 21, 2013

Related U.S. Application Data

(63) Continuation of application No. PCT/JP2010/057182, filed on Apr. 22, 2010.

(51) Int. Cl.
G06F 1/00 (2006.01)
G06F 1/32 (2006.01)
G06F 11/34 (2006.01)
H04W 52/02 (2009.01)

(52) U.S. Cl.
CPC ........... *G06F 1/3203* (2013.01); *G06F 1/3287* (2013.01); *G06F 1/3284* (2013.01); *G06F 11/3423* (2013.01); *G06F 2201/81* (2013.01); *H04W 52/028* (2013.01); *Y02B 60/1217* (2013.01); *Y02B 60/1282* (2013.01)

(58) Field of Classification Search
CPC ........... G06F 11/3423; G06F 2201/81; G06F 1/3284
USPC .................................... 713/300, 320
See application file for complete search history.

(56) References Cited

U.S. PATENT DOCUMENTS 5,481,733 A 1/1996 Douglis et al.
5,913,067 A * 6/1999 Klein ........................... 713/300

(Continued)

FOREIGN PATENT DOCUMENTS

JP 8-87383 4/1996
JP 2002-86844 3/2002
JP 2004-62405 2/2004

(Continued)

OTHER PUBLICATIONS

International Search Report of Corresponding PCT Application PCT/JP2010/057182 mailed Jul. 13, 2010.

(Continued)

*Primary Examiner* — Xuxing Chen
(74) *Attorney, Agent, or Firm* — Staas & Halsey LLP

(57) ABSTRACT

A multiple-core processor system includes a memory unit storing the number of time intervals within a time bin, a time interval being a time interval between two consecutive operations; and a processor configured to: update the number of time intervals, specify a time stretch during which the number of time intervals stays above a threshold, and set, based on the number of time intervals, a power supply mode in which the multiple-core processor is supplied with power.

5 Claims, 17 Drawing Sheets

(56) References Cited

U.S. PATENT DOCUMENTS

2006/0053315 A1* 3/2006 Menzl .......................... 713/300
2007/0288777 A1* 12/2007 Schutte ........................ 713/320
2008/0250260 A1 10/2008 Tomita

FOREIGN PATENT DOCUMENTS

| JP | 2008-210316 | 9/2008 |
| JP | 2008-257578 | 10/2008 |

OTHER PUBLICATIONS

Japanese Office Action mailed Apr. 2, 2013 for corresponding Japanese Application No. 2012-511466.
International Preliminary Report on Patentability for PCT/JP2010/057182, mailed on Nov. 15, 2012, 13 pages.
Extended European Search Report of European Patent Application 10850237.8 dated Feb. 24, 2016.

* cited by examiner

FIG.2

| TIME OF DETECTION | TYPE |
|---|---|
| 00:12:05 | OPERATION |
| 00:12:22 | ARRIVAL |
| 00:12:32 | OPERATION |
| 00:20:32 | OPERATION |
| 00:20:33 | OPERATION |
| 00:20:34 | OPERATION |
| 00:20:35 | OPERATION |
| 00:50:22 | ARRIVAL |
| 00:55:35 | OPERATION |
| ⋮ | ⋮ |

FIG.5

| TIME SEGMENT | $\Delta t_c$ | $\Delta t_i$ | $p_a$ |
|---|---|---|---|
| 00:00:00 - 5:59:59 | 10 | 19000 | 0.13 |
| 06:00:00 - 11:59:59 | 25 | 3200 | 0.65 |
| 12:00:00 - ... | 30 | 1000 | 0.83 |
| ... | ... | ... | ... |

FIG.12

| 00:12:05 | OPERATION |
|---|---|
| 00:12:32 | OPERATION |
| 00:20:32 | OPERATION |
| 00:20:35 | OPERATION |
| ⋮ | ⋮ |

8 MINUTES { (rows 1-4)

27 SECONDS } (rows 1-2)

3 SECONDS } (rows 3-4)

METHOD AND SYSTEM FOR SETTING POWER SUPPLY MODE OF A MULTIPLE-CORE PROCESSOR SYSTEM BASED ON CONDITION OF A TIME BIN DURING A NUMBER OF TIME INTERVALS WITHIN THE TIME BIN IS EQUAL TO OR LARGER THAN A SECOND THRESHOLD

CROSS REFERENCE TO RELATED APPLICATIONS

This application is a continuation application of International Application PCT/JP2010/057182, filed on Apr. 22, 2010 and designating the U.S., the entire contents of which are incorporated herein by reference.

FIELD

The embodiments discussed herein are related to a multi-core processor system, a computer product, and control method that control the switching of power supply modes.

BACKGROUND

A single core processor system operates at night, as a power conservation technique, in a low power consumption mode where the system operated at a slower clock speed. For example, a printer performs a print job such as the time-specified printing at night in a low power consumption mode (hereinafter, "related art 1") (see, for example, Japanese Laid-open Patent Publication No. 2002-86844).

A multiple-core processor system has divided a process performed by one application into multiple segments and used multiple central processing units (CPU) to perform the process in parallel, thereby enhancing the performance. Therefore, the application runs faster.

The multiple-core processor system consumes more power when multiple CPUs perform a process in parallel than when one CPU performs the process. When high performance is desired more than power conservation, it is better to perform parallel processing with multiple CPUs. On the other hand, when high performance such as a shorter processing time is not required, some CPUs may be turned off to reduce the number of CPUs so that power consumption is reduced.

In a cellular phone, processes such as updating of software or self-checking of the system are performed automatically in the background aside from a phone call, email, or a browser which a user activates. Recently, as a cellular phone system becomes more complicated, the automatic background processes are increasing. However, many of the background processes are not urgent.

Unlike the case of the printer, there will be a user who uses a cellular phone at night. Some user may use the device frequently at night. Therefore, the reduction of CPUs during a fixed time period such as night lowers the performance if the user frequently operates the device during that time period.

Even in the daytime, some user does not use the device. Thus, the activation of many CPUs in the daytime wastes the power.

SUMMARY

According to an aspect of an embodiment, a multiple-core processor system includes a memory unit storing the number of time intervals within a time bin, a time interval being a time interval between two consecutive operations; and a processor configured to update the number of time intervals; specify a time stretch during which the number of time intervals stays above a threshold; and set, based on the number of time intervals, a power supply mode in which the multiple-core processor is supplied with power.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting one example of history information 200;

FIG. 5 is a diagram depicting one example of learning information 500;

FIG. 12 is a diagram depicting one example of extracted information concerning an operation;

DESCRIPTION OF EMBODIMENTS

Preferred embodiments of a multi-core processor system, a control program, and a control method according to the present invention will be described in detail with reference to the accompanying drawings. The control program and the control method will be described in detail. In the multi-core processor of the present embodiment, a multi-core processor is a processor equipped with multiple cores. Provided the cores are provided in plural, the system may include a single processor equipped with multiple cores or a group of single-core processors in parallel. In the embodiment, for the sake of simplicity, an example will be described using a group of CPUs that are single-core processors in parallel.

Figure 1:
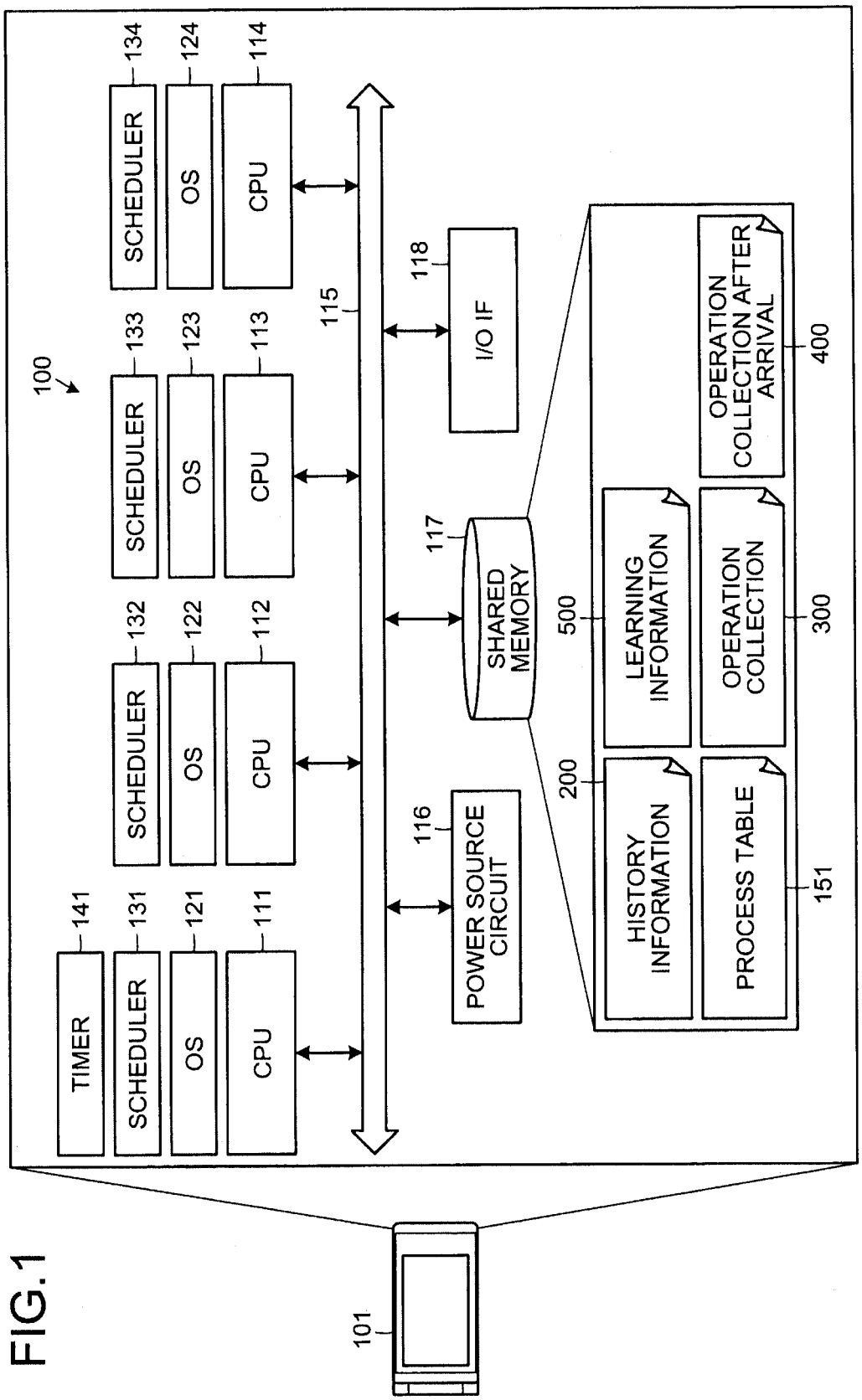
FIG. 1 is a block diagram depicting a hardware configuration of a multiple core processor system according to embodiments.

FIG. 1 is a block diagram depicting a hardware configuration of a multiple core processor system according to embodiments. In FIG. 1, a multiple core processor system 100 in a cellular phone 101 includes, for example, CPUs 111 to 114, a power source circuit 116, a shared memory 117, and an input/output interface (I/O IF) 118. Elements are connected each other by a bus 115. In FIG. 1, the cellular phone 101 has been given as an example of a device having a multiple core processor system but the device may be a mobile terminal such as an e-book reader or a personal computer.

Each of the CPUs 111 to 114 includes cores, registers, and cache. The CPU 111 performs an OS 121, a master OS. The OS 121 includes a scheduler 131 that controls the allocation of applications. The CPUs 112 to 114 perform an OS 122 to an OS 124, slave OS's and performs a process allocated by the scheduler 131. The OS's 122 to 124 include schedulers 132 to 134 respectively. The schedulers 131 to 134 switch processes when multiple processes are allocated to the CPU for which the scheduler works.

The power supply circuit 116 supplies each element with electric power (power source voltage). In this embodiment, the multiple core processor system 100 works in the first power supply mode and the second power supply mode for supplying the multiple-core processor with electric power. In the first power supply mode, at least two CPUs are supplied with electric power and in the second power supply mode, CPUs less than in the first power supply mode are supplied with electric power. In this embodiment, all CPUs, CPU 111 to CPU 114, are supplied with electric power in the first power supply mode, and the CPU 111 alone is supplied with electric power in the second power supply mode.

For example, in this embodiment, a register of the CPU 111 stores a value that indicates the power supply mode. When the register holds 0, the mode is the first power supply mode. When the register holds 1, the mode is the second power supply mode. When the register holds 0, the power supply circuit 116 supplies all CPUs, CPUs 111 to 114, with electric power. When the register holds 1, the power supply circuit 116 supplies only the CPU 111, among the CPUs 111 to 114, with electric power.

In the first power supply mode, the scheduler 131 selects, from among all CPUs, a CPU to which a process is allocated. In the second power supply mode, the scheduler 131 allocates all processes to the CPU 111. When the mode is switched from the first to the second power supply mode, the scheduler 131 migrates to the CPU 111, the processes allocated to the CPUs 112 to 114.

A timer 141 is, for example, an application running on the CPU 111. The timer 141, once activated by the OS 121, measures the time stretch $\Delta t_c$ from the time when a certain operation is detected.

The I/O IF 118 controls, for example, input from an external device and output to an external device. The cellular phone 101 includes, for example, an input device such as a touch panel. In the multiple-core processor system 100, an input from the input device is reported to the multiple-core processor via the I/O IF 118. An operation means, for example, an open/close operation or a key operation on the touch panel in the case of a cellular phone. An OS detects a key operation via the I/O IF 118 every time a user pushes a key. The arrival indicates the receiving of emails or the arrival of a telephone call. The multiple-core processor system 100 is connected to, for example, a network such as the Internet via the IF (not shown) and sends and receives email.

The shared memory 117 is, for example, a memory shared by the multiple-core processor. The shared memory 117 stores, for example, a process table 151, history information 200, an operation collection 300, an operation collection after the arrival 400, learning information 500, programs such as boot programs for the OS's 121 to 124. The shared memory 117 includes, for example, a read only memory (ROM), a random access memory (RAM), and a flash ROM.

The ROM or flash ROM stores the programs. The RAM is used as a work area for the CPUs 111-114. The programs stored in the shared memory 117 are loaded to each CPU that executes coded processes. In this embodiment, the OS 121 includes a control program that switches modes according to the learning information 500. Since the CPU 111 loads the OS 121 and executes coded processes, the CPU 111 executes processes coded in the control program.

The process table 151 indicates, for example, to which CPU each process is allocated and whether the CPU is executing a process. Each CPU reads out the process table 151 and stores the process table 151 in the cache of each CPU. The scheduler 131 allocates processes to one of CPUs 111 to 114 and registers in the process table 151 which CPU the processes have been allocated to.

When processes are switched, each CPU registers in the process table 151 which process is being executed. After a process is terminated, each CPU deletes the process from the process table 151. A cache of each CPU undergoes the snoop process and maintains the consistency of the process table 151 when a CPU alters the process table 151.

FIG. 2 is a diagram depicting one example of the history information 200. The history information 200 includes a detection time column 201 and an event type column 202. The detection time column stores time when an event is detected. The event means an operation or the arrival. The event type column 202 stores a type of a detected event. For example, the event type column 202 stores operation at 00:12:05 in the detection time column 201. The history information 200 indicates that an operation is detected at 00:12:05.

Figure 3:
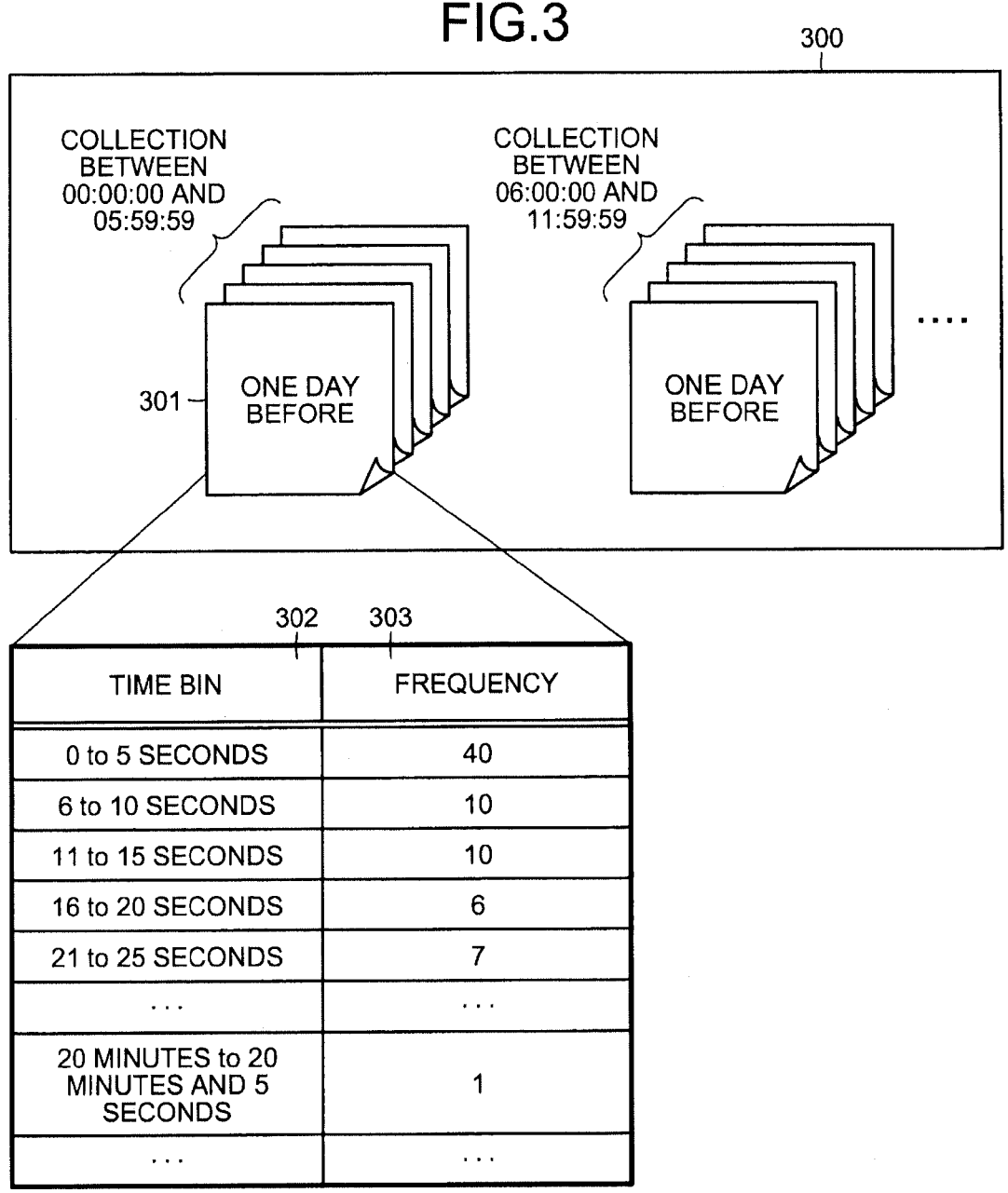
FIG. 3 is a diagram depicting an example of operation collection 300.

FIG. 3 is a diagram depicting an example of the operation collection 300. Each result in the operation collection 300 includes a time interval between two consecutive operations of the cellular phone 101. The number of time intervals (the number of operations subsequently occurring) that fall within a time bin is counted. As an example, a result 301 includes a time bin column 302 and a frequency column 303. The operation collection 300 is classified according to time segments: for example, a result in a time segment between 00:00:00 and 05:59:59 and a result in a time segment between 06:00:00 and 11:59:59.

The classification according to time segments is not limited to this example. The operation collection 300 may be divided into a result of working days and a result of holidays or into results of each day of the week.

Further, a result between 00:00:00 and 05:59:59 is stored, for example, for five days. The oldest result is deleted when a new one is stored.

Figure 4:
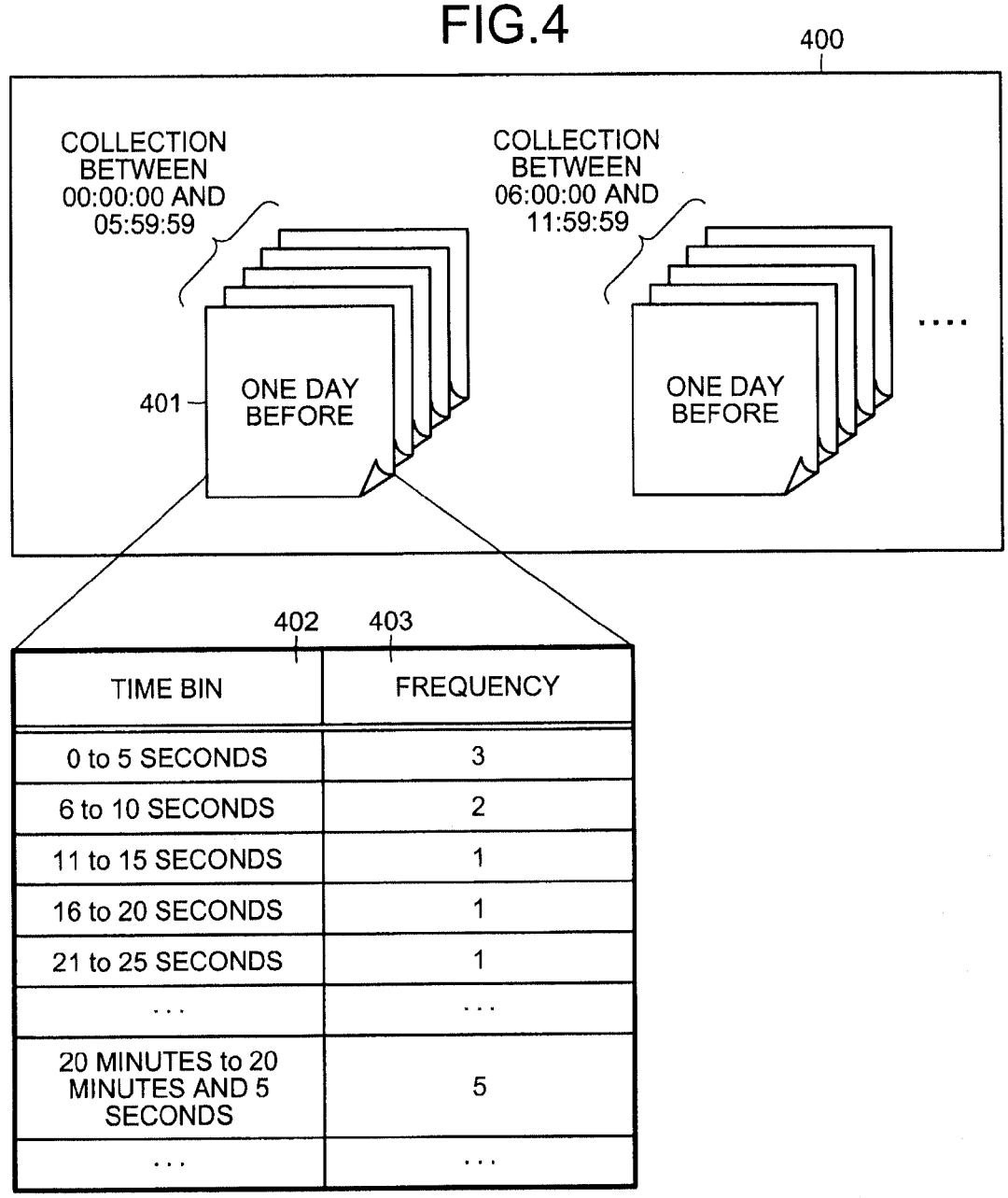
FIG. 4 is a diagram depicting one example of the operation collection after arrival 400.

FIG. 4 is a diagram depicting one example of the operation collection after the arrival 400. The operation collection after the arrival 400 stores frequencies of operation occurrence during a time interval between the detection of the arrival and the detection of an operation of the cellular phone 101. As an example, a result 401 includes a time bin column 402 and a frequency column 403.

The operation collection after the arrival 400 is classified according to time segments: a result in a time segment between 00:00:00 and 05:59:59 and a result in a time segment between 06:00:00 and 11:59:59.

FIG. 5 is a diagram depicting one example of the learning information 500. The learning information 500 includes a time segment column 501, a $\Delta t_c$ column 502, a $\Delta t_i$ column 503, and a $p_a$ column 504. The time segment column 501 stores time segments 00:00:00 to 05:59:59, 06:00:00 to 11:59:59, and 12:00:00 to . . .

The $\Delta t_c$ column 502 stores $\Delta t_c$ collected for each time segment. The $\Delta t_i$ column 503 stores $\Delta t_i$ collected for each time segment. The $p_a$ column 504 stores $p_a$ collected for each time segment.

Figure 6:
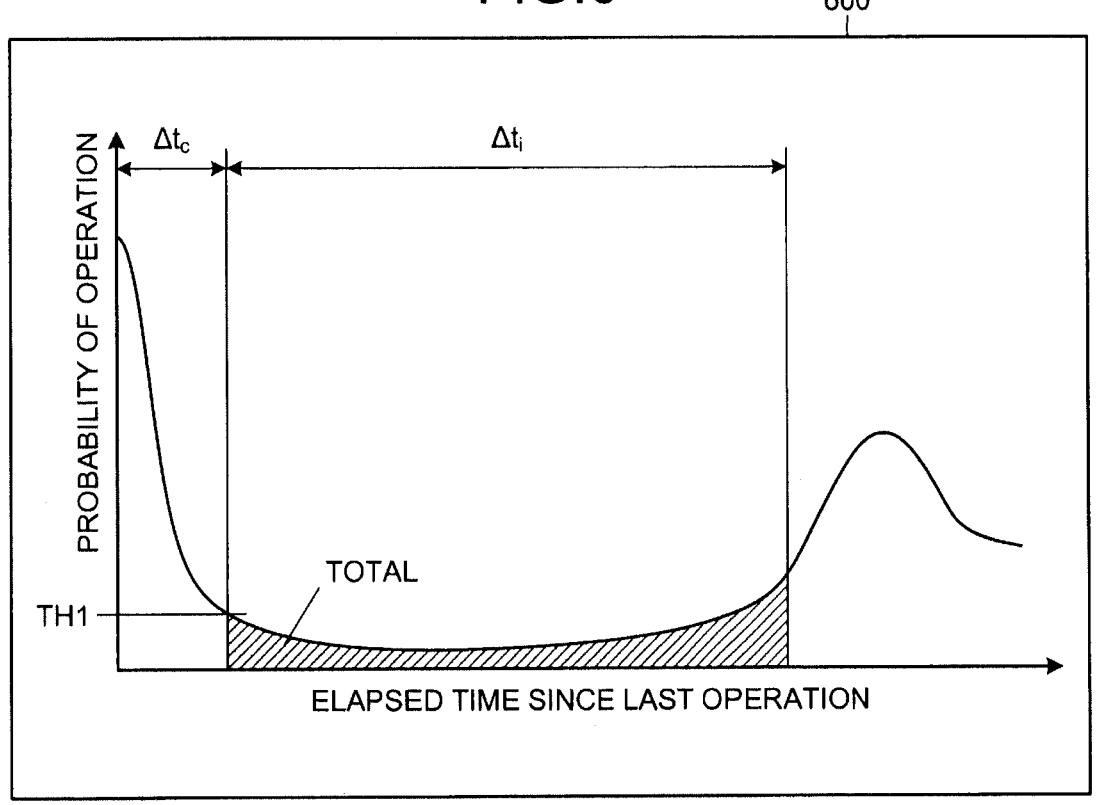
FIG. 6 is a diagram depicting one example of an analysis result concerning operations.

FIG. 6 is a diagram depicting one example of an analysis result concerning operations. An analysis result 600 is a graph that depicts the probability of subsequent operation occurrence for each time bin. $\Delta t_c$ is a time interval until the probability of subsequent operation occurrence becomes less than a specific threshold (hereinafter "TH1") from the initial operation (time origin).

$\Delta t_i$ is a time stretch where the cumulative probability of subsequent operation occurrence (TOTAL) after $\Delta t_c$ exceeds a specific threshold (hereinafter, "TH2"). For example, when $\Delta t_c$ stretches over 0 to 5 seconds, "five seconds" is stored in the $\Delta t_c$ column 502 in the learning information 500.

In the analysis result 600, the vertical axis denotes the probability of operation occurrence and the horizontal axis denotes a time interval between two consecutive operations. The vertical axis of the analysis result 600 may be frequencies of operation instead of the probability of operation occurrence. In this embodiment, an operation includes the operation of keys. A user is likely to operate keys successively when sending email. When the user sends email, the probability of operation occurrence becomes higher as the time interval comes close to 0 second as depicted in the analysis result 600.

Figure 7:
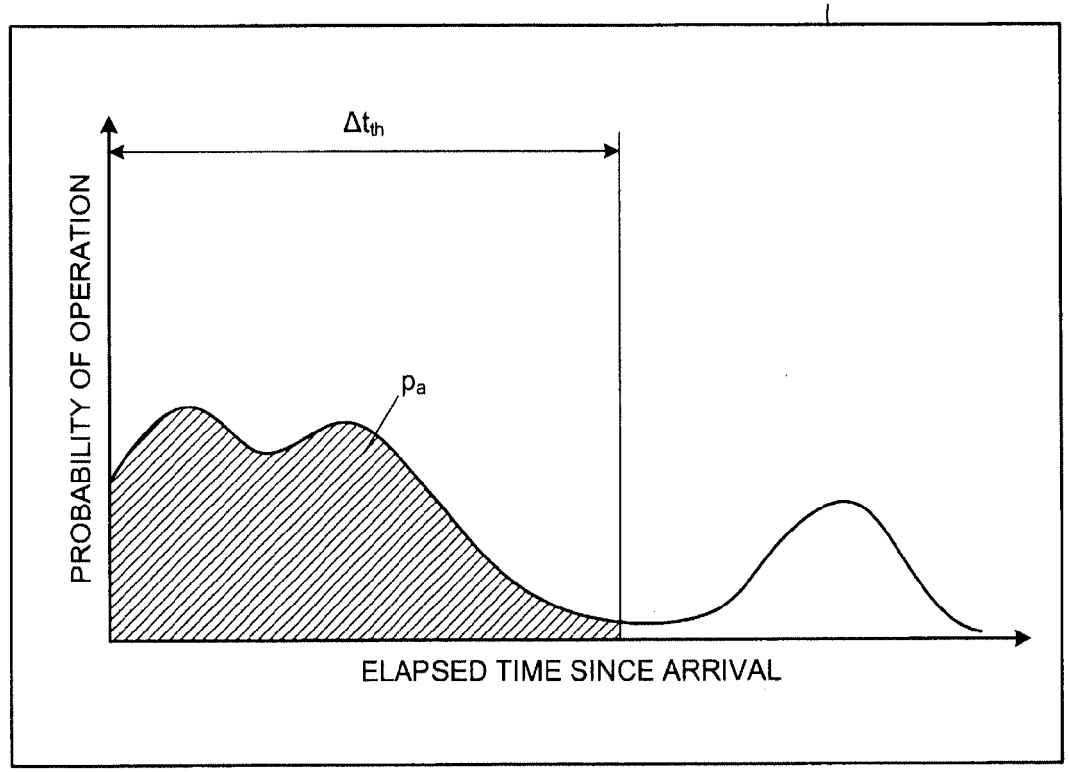
FIG. 7 is a diagram depicting one example of a collected result of operation patterns after the arrival.

FIG. 7 is a diagram depicting one example of a collected result of operation patterns after the arrival. An analysis result 700 is a graph that depicts the probability of operation occurrence against a time interval between the detection of the arrival and the detection of an operation. The arrival means, for example, the arrival of calling and email.

In the analysis result 700, the vertical axis denotes the probability of operation occurrence and the horizontal axis denotes an elapsed time from the arrival. The vertical axis of the analysis result 700 may be frequencies of operation occurrence. $\Delta t_{th}$ is the minimum of a time stretch by which the electric power control produces benefits. $\Delta t_{th}$ is determined when the multiple-core processor system 100 is designed. $p_a$ is the cumulative probability of operation occurrence from the detection of the arrival until $\Delta t_{th}$ elapses.

For example, when it is six o'clock switching the time segments from the time segment of 00:00:00 to 05:59:59 to the time segment of 06:00:00 to 11:59:59, the operation analysis and the operation-after-arrival analysis are performed. The $\Delta t_c$ column 502, the $\Delta t_i$ column 503, and the $p_a$ column 504 are updated.

Figure 8:
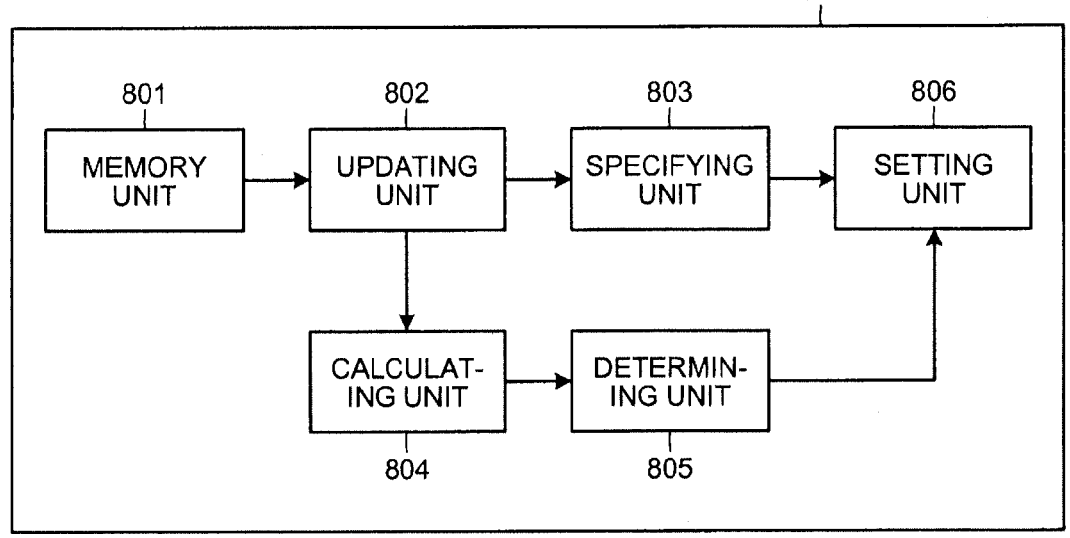
FIG. 8 is a block diagram depicting an OS 121.

FIG. 8 is a block diagram depicting the OS 121. The OS 121 includes a memory unit 801, an updating unit 802, a specifying unit 803, a calculating unit 804, a determining unit 805, and a setting unit 806. The OS 121 is loaded to the CPU 111 and the coded processes in the OS 111 are executed by the CPU 111. Therefore, each unit is executed by the CPU 111.

The memory unit 801 stores frequencies of subsequent operation (a time interval between two consecutive operations) done to an apparatus having a multiple-core processor for each time bin. The apparatus may be a cellular phone 101.

The updating unit 802 updates the frequencies of subsequent operation stored in the memory unit 801.

The specifying unit 803 specifies a time interval under a condition that the updated frequencies of subsequent operation is at least a specific threshold (TH1).

The setting unit 806 sets a power supply mode to the first power supply mode when an operation is detected. The setting unit 806 switches the modes from the first power supply mode to the second power supply mode when the time from the operation has been detected passes the time interval specified by the specifying unit 803.

The memory unit 801 also stores frequencies of operation for each time bin from the detection of the arrival to the detection of an operation for the cellular phone 101 having a multiple-core processor.

The updating unit 802 updates the frequencies of operation.

The calculating unit 804 calculates the sum of frequencies after the update by the updating unit 802.

The determining unit 805 determines whether the sum output from the calculating unit 804 is at least the specific threshold (TH2).

The setting unit 806 sets the mode to the first power supply mode when the sum is at least the specific threshold. The setting unit 806 does not change the power supply mode when the sum is not at least the specific threshold.

A detailed example is explained with a flowchart.

Figure 9:
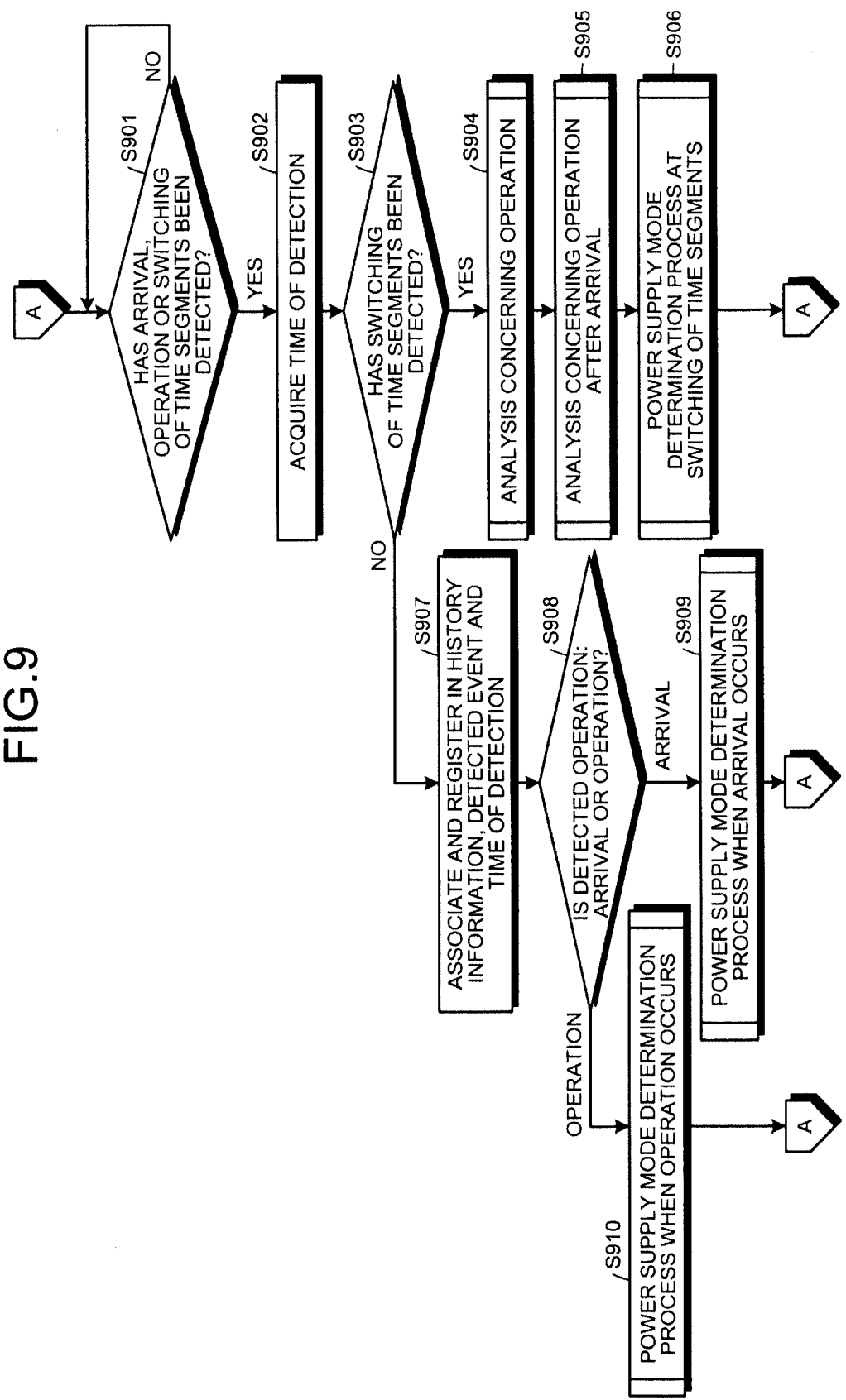
FIG. 9 is a flowchart depicting one example of a control process of the OS 121.

FIG. 9 is a flowchart depicting one example of the control process of the OS 121. The OS 121 determines whether the arrival, an operation or the switching of the time segments is detected (step S901). If the OS 121 does not detect anything (step S901: NO), the process returns to step S901.

If the OS 121 detects one of the arrival, an operation or the switching of the time segments (step S901: YES), the time of detection is acquired (step S902) and it is determined whether a detected event is the switching of the time segments (step S903). If the OS 121 determines that the detected event is the switching of the time segments (step S903: YES), the OS 121 performs the analysis concerning operations (step S904). The OS 121 performs the analysis concerning operations after the arrival (step S905) and performs a power supply mode determination process at the switching of the time segments (step S906).

If the OS 121 determines that the detected event is not the switching of the time segments (step S903: NO), the OS 121 registers in the history information the detected event and the time that are associated each other (step S907). The OS 121 determines whether the detected event is the arrival or an operation (step S908). If the detected event is the arrival (step S908: arrival), the OS 121 executes the power supply mode determination process at the arrival (step S909).

If the OS 121 determines that the detected event is an operation (step S908: operation), the OS 121 executes the power supply mode determination process at the operation (step S910). The process returns to step S901 after steps S906, S909, or S910.

Figure 10:
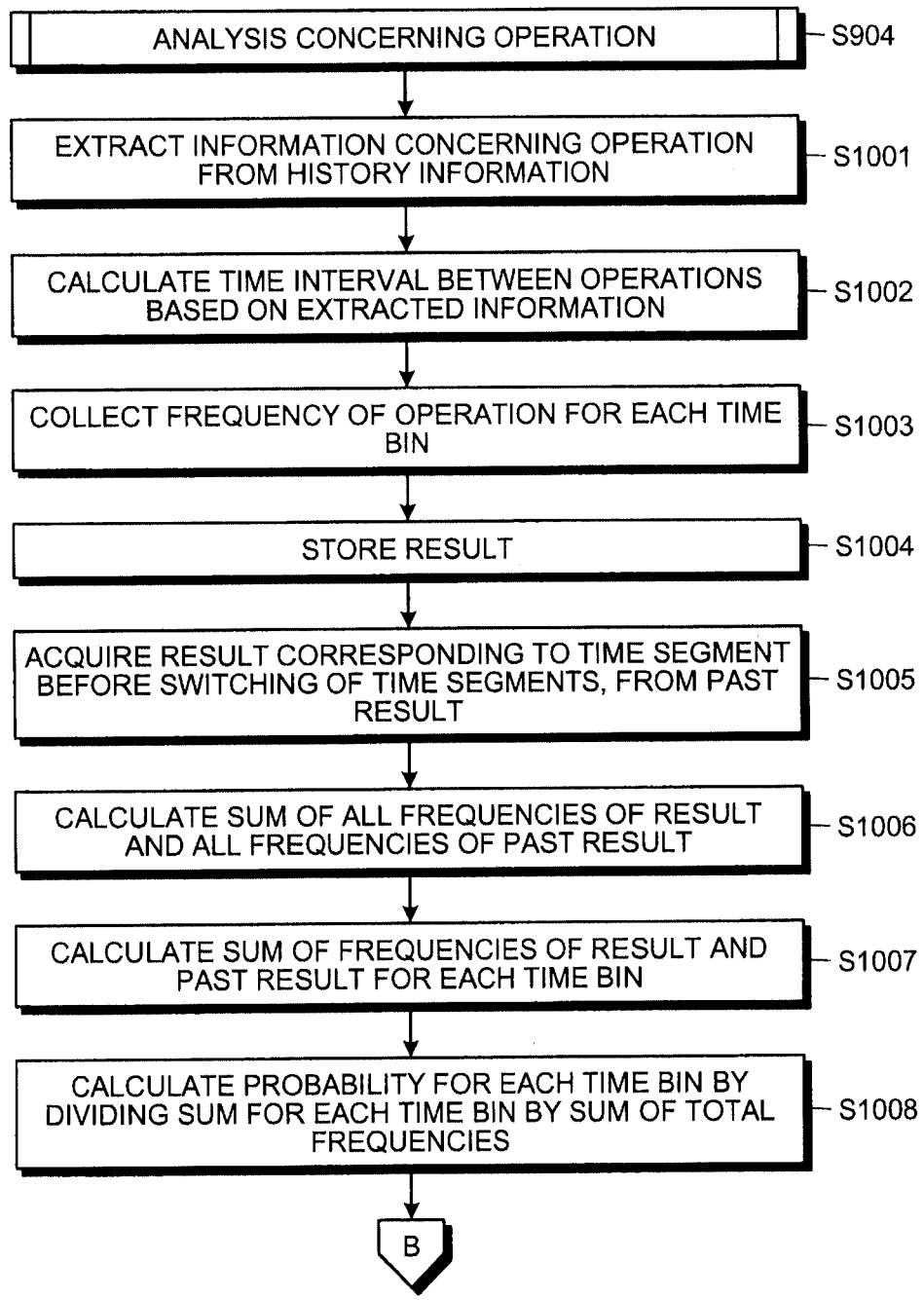
FIG. 10 is a flowchart (part 1) of an analysis process concerning an operation in FIG. 9 (step S904)
Figure 11:
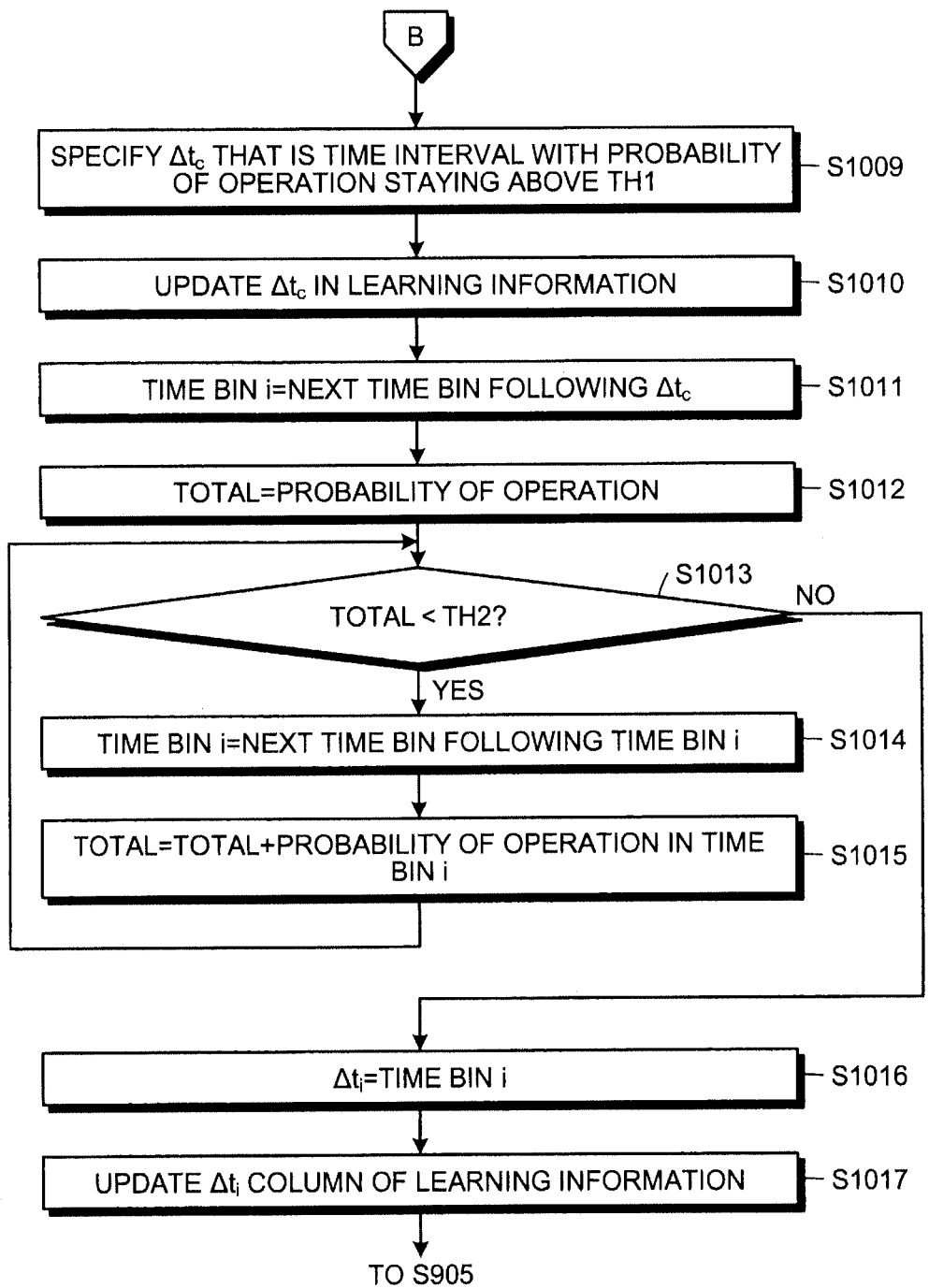
FIG. 11 is a flowchart (part 2) of the analysis process concerning an operation in FIG. 9 (step S904)

FIG. 10 and FIG. 11 are flowcharts of an analysis process concerning an operation in FIG. 9 (step S904). The OS 121 extracts information concerning an operation from the history information (step S1001) and calculates a time interval between operations based on the extracted information (step S1002).

FIG. 12 is a diagram depicting one example of extracted information concerning an operation. For example, when it is 6 o'clock, the switching of the time segments is detected and information concerning operations between 00:00:00 and 05:59:59 is extracted from the history information. The OS 121 calculates the time interval between operations based on the time. For example, the time interval between an operation detected at 00:12:05 and one detected at 00:12:32 is 27 seconds.

The explanation goes back to FIG. 10. The OS 121 collects frequencies of operation for each time bin (step S1003) and stores the collected result (step S1004). The collected result is labeled as the result belonging to the time segment before the switching of the time segments occurs and stored. One example of the collected result is depicted in FIG. 3.

The OS 121 acquires the collected result corresponding to the time segment before the switching of the time segments (step S1005) and calculates the sum of all frequencies of the collected result and all frequencies of the past collected result (step S1006). The OS 121 calculates the sum of frequencies of the past collected result and the collected result for each time bin (step S1007).

The OS 121 divides the sum for each time bin by the sum of the total frequencies and outputs the probability for each time bin (step S1008). An example of the probability of operation for each time bin is depicted in FIG. 6. The OS 121 specifies $\Delta t_c$ that is the time interval with the probability of operation staying above TH1 (step S1009) and updates $\Delta t_c$ in the learning information (step S1010).

The OS 121 determines that the time bin i=the next time bin following $\Delta t_c$ (step S1011) and TOTAL=probability of operation (step S1012). The OS 121 determines whether TOTAL<TH2 (step S1013). If TOTAL<TH2 (step S1013: YES), the OS 121 determines that the time bin i=the next time bin following the time bin i (step S1014) and TOTAL=TOTAL+probability of operation in the time bin i (step S1015). The process returns to step S1013.

If the condition of TOTAL<TH2 is not satisfied (step S1013: NO), the OS 121 determines that $\Delta t_i$=the time bin i (step S1016) and updates the $\Delta t_i$ column of the learning information before the switching of the time segments (step S1017). The process goes to step S905.

Figure 13:
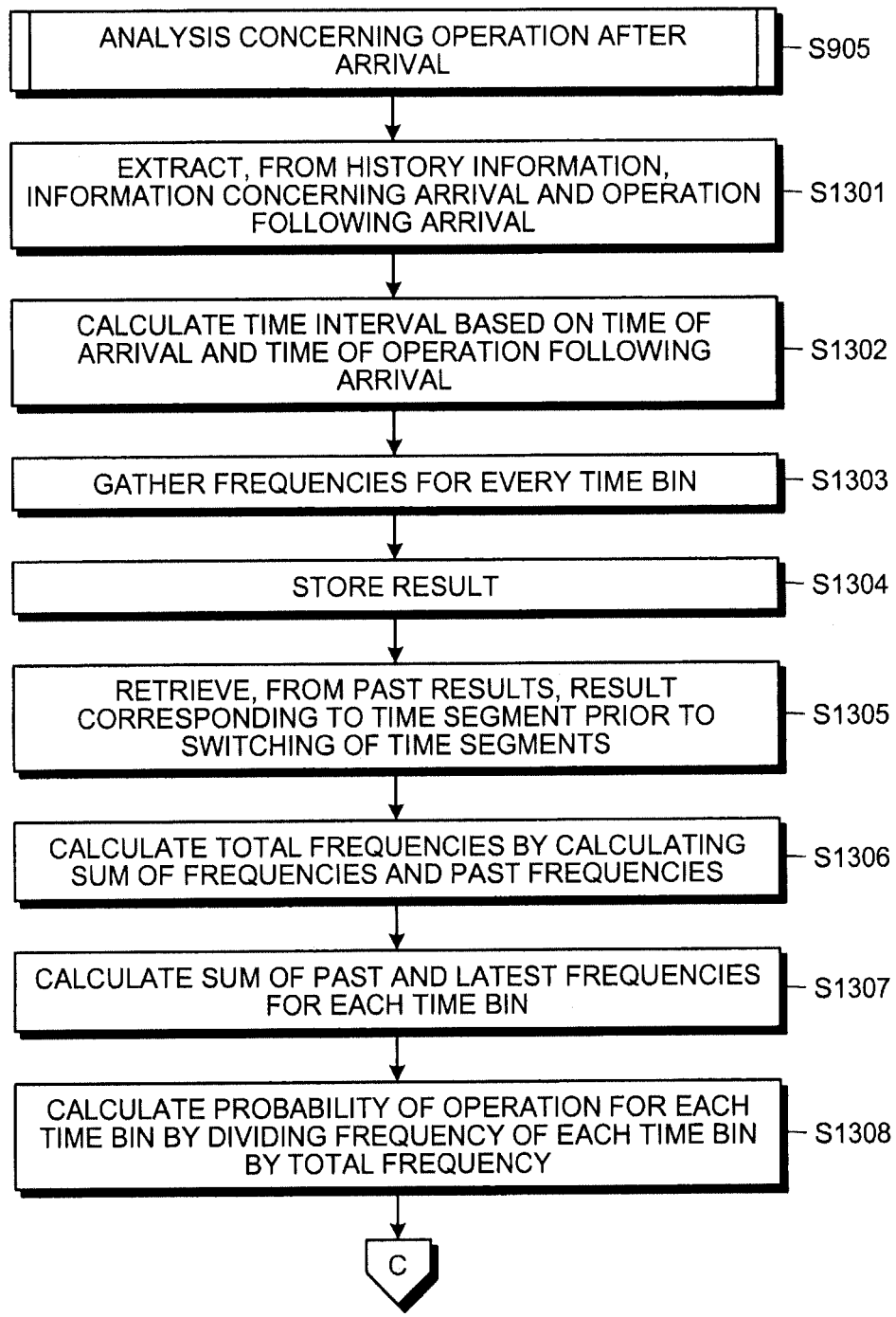
FIG. 13 is a flowchart (part 1) of the analysis process (step S905) concerning operations after the arrival in FIG. 9.
Figure 14:
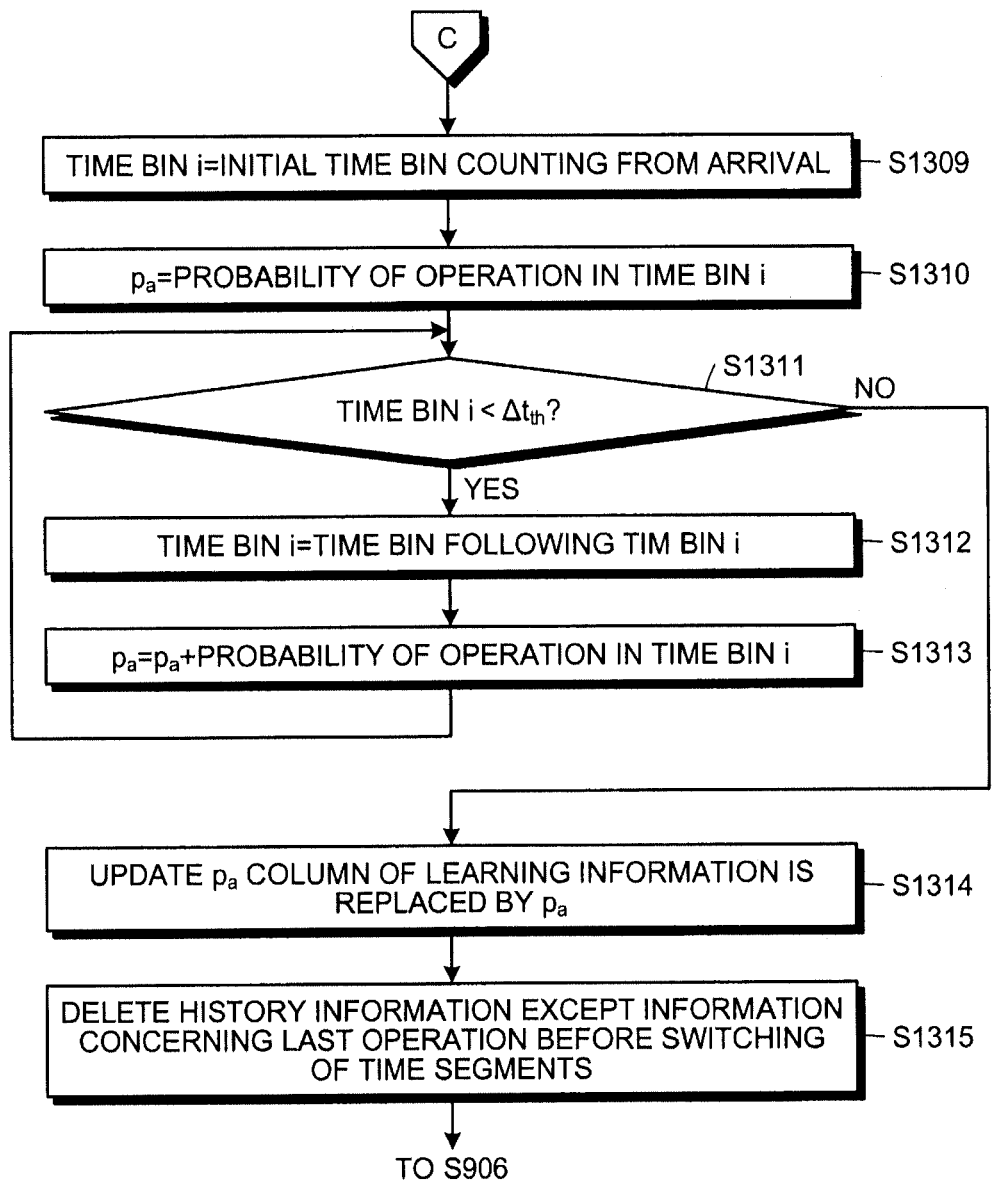
FIG. 14 is a flowchart (part 2) of the analysis process (step S905) concerning operations after the arrival in FIG. 9.

FIG. 13 and FIG. 14 are flowcharts of the analysis process (step S905) concerning operations after the arrival in FIG. 9. The OS 121 extracts, from the history information, information concerning the arrival and the operation following the arrival (step S1301). The OS 121 calculates the time interval based on the time of the arrival and the time of the operation following the arrival (step S1302).

The OS 121 gathers frequencies for every time bin (step S1303) and stores the result (step S1304). The OS 121 retrieves from the past results a result corresponding to the time segment prior to the switching of the time segments (step S1305). The OS 121 calculates the total frequencies by calculating the sum of the frequencies and the past frequencies (step S1306).

The OS 121 calculates the sum of the past and the latest frequencies for each time bin (step S1307). The OS 121 outputs the probability of operation for each time bin by dividing the frequency for each time bin by the total frequency (step S1308). The result of the calculation of the probability is illustrated as a graph in FIG. 7

The OS 121 determines that the time bin i=the initial time bin from the arrival (step S1309) and $p_a$=probability of operation in the time bin i (step S1310). The OS 121 determines whether the time bin i<$\Delta t_{th}$ (step S1311). If the time bin i<$\Delta t_{th}$ (step S1311: YES), the OS 121 determines that the time bin i=the time bin following the time bin i (step S1312). The OS 121 determines that $p_a=p_a$+probability of operation in the time bin i (step S1313). The process returns to step S1311.

If the condition of the time bin i<$\Delta t_{th}$ is not satisfied (step S1311: NO), the $p_a$ column of the learning information before the switching of the time segments is updated and is replaced by $p_a$ (step S1314). The OS 121 deletes the history information except information concerning the last operation before the switching of the time segments occurs (step S1315). The process goes to step S906.

Figure 15:
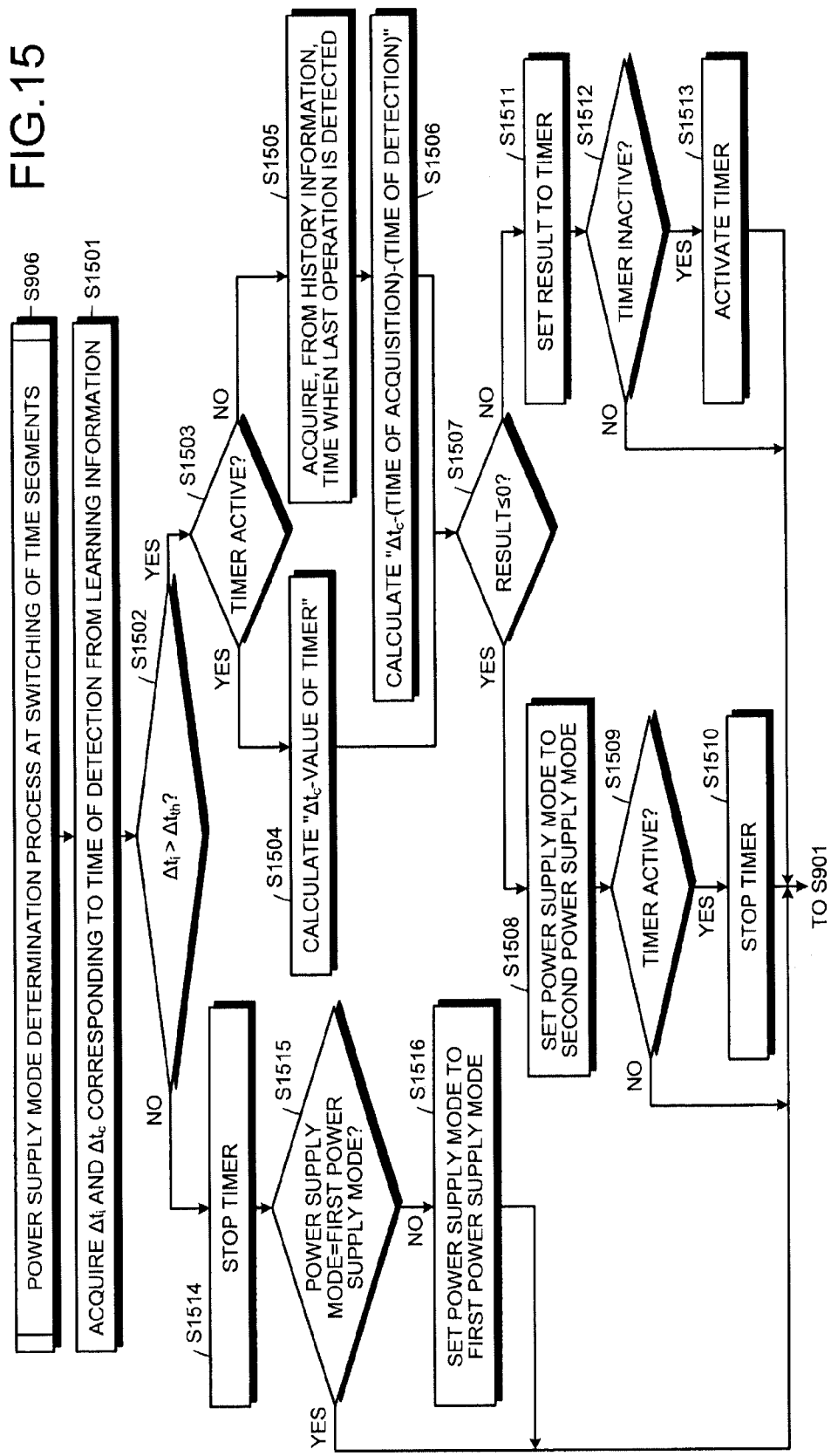
FIG. 15 is a flowchart of the power supply mode determination process at the switching of the time segments (step S906) in FIG. 9.

FIG. 15 is a flowchart of the power supply mode determination process at the switching of the time segments (step S906) in FIG. 9. The OS 121 acquires $\Delta t_i$ and $\Delta t_c$ corresponding to the time of detection from the learning information (step S1501). For example, when the time of detection is 06:00:00, the $\Delta t_c$ column 502 and the $\Delta t_i$ column 503 in the row of the time segment column 501 of 06:00:00 to 11:59:59 within the learning information 500 are obtained.

The OS 121 determines whether $\Delta t_i$>$\Delta t_{th}$ is true (step S1502). If $\Delta t_i$>$\Delta t_{th}$ is true (step S1502: YES), the OS 121 determines whether the timer is active (step S1503). If the time is active (step S1503: YES), the OS 121 calculates "$\Delta t_c$–a value of timer" (step S1504). The process goes to step S1507.

In step S1503, if the timer is not active (step S1503: NO), the OS 121 acquires from the history information the time when an operation is detected before the switching of the time segments (step S1505). Here, the history information 200 stores only the last operation before the switching of the time segments. The OS 121 calculates "$\Delta t_c$–(time of acquisition)–(time of detection)" (step S1506). The process goes to step S1507.

The OS 121 determines whether the result Calculated≤0 is true (step S1507). If the result Calculated≤0 is true (step S1507: YES), the power supply mode is set to the second power supply mode (step S1508). The OS determines whether the timer is active (step S1509). If the timer is active (step S1509: YES), the OS 121 stops the timer (step S1510). The process returns to step S901.

If the timer is not active in step S1509 (step S1509: NO), the process returns to step S901. If the condition of the result calculated≤0 is not satisfied (step S1507: NO), the OS 121 sets the result to the timer (step S1511) and determines whether the timer is not active (step S1512).

If the timer is not active (step S1512: YES), the OS 121 activates the timer (step S1513). The process returns to step S901. If the timer is not inactive (step S1512: NO), the process returns to step S901.

If the condition of $\Delta t_i$>$\Delta t_{th}$ is not satisfied in step S1502 (step S1502: NO), the OS 121 stops the timer (step S1514) and determines whether the power supply mode is in the first power supply mode (step S1515). For example, the OS 121 checks a register concerning the power supply mode and specifies the power supply mode. If the power supply mode is not in the first power supply mode (step S1515: NO), the power supply mode is set to the first power supply mode (step S1516) and the process returns to step S901. If the power supply mode is in the first power supply mode (step S1515: YES), the process returns to step S901.

Figure 16:
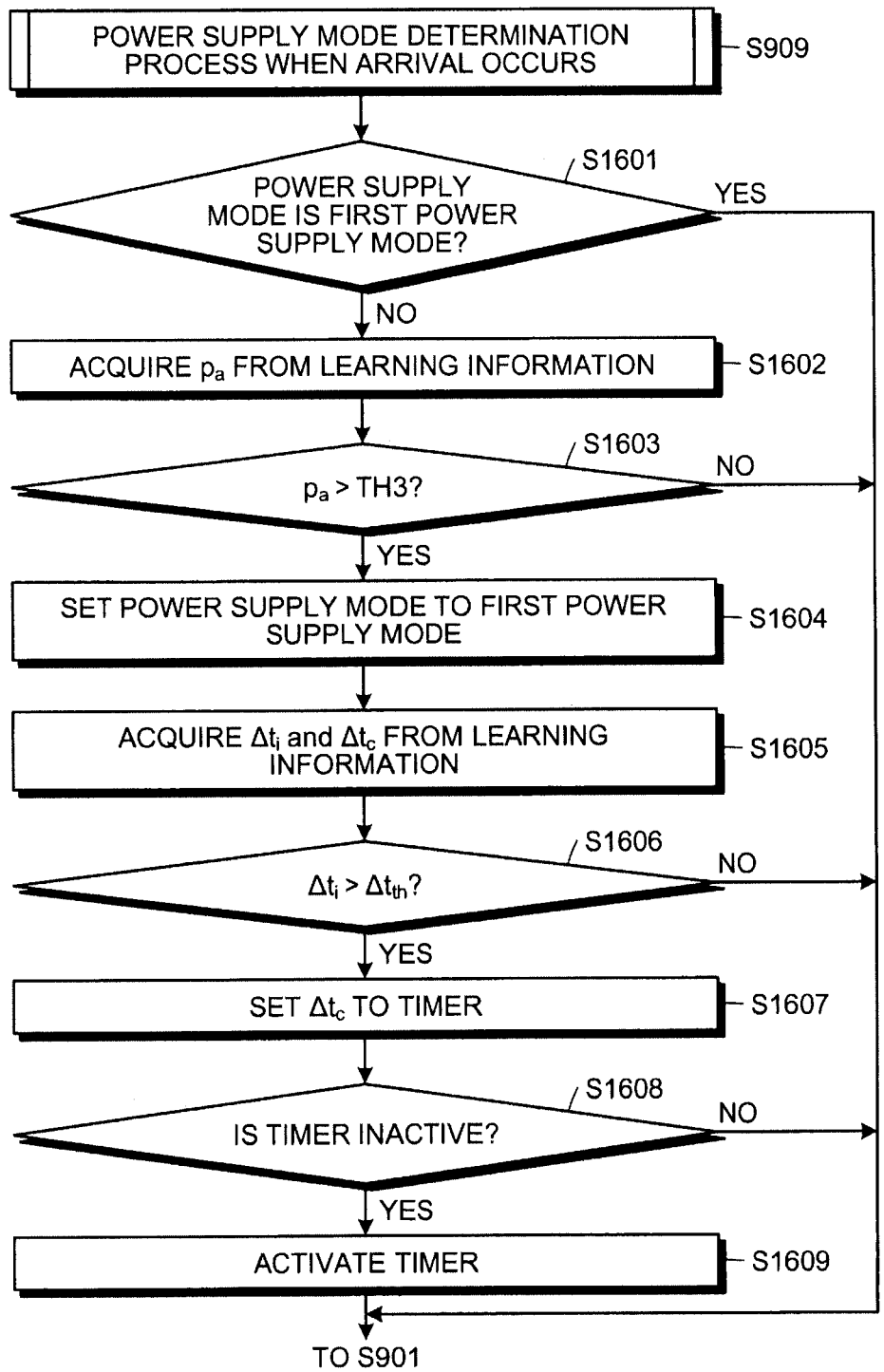
FIG. 16 is a flowchart of a power supply mode determination process after arrival (step S909) in FIG. 9.

FIG. 16 is a flowchart of the power supply mode determination process after arrival (step S909) in FIG. 9. The OS 121 determines whether the power supply mode is in the first power supply mode (step S1601). If the power supply mode is in the first power supply mode (step S1601: YES), the process returns to step S901.

If the power supply mode is not in the first power supply mode (step S1601: NO), the OS 121 acquires $p_a$ corresponding to the time of detection from the learning information (step S1602). The OS 121 determines whether $p_a$>TH3 (step S1603). If the condition of $p_a$>TH3 is not satisfied (step S1603: NO), the process returns to step S901.

If $p_a$>TH3 (step S1603: YES), the OS 121 sets the power supply mode to the first power supply mode (step S1604) and acquires $\Delta t_i$ and $\Delta t_c$ from the learning information (step S1605). The OS 121 determines whether $\Delta t_i$>$\Delta t_{th}$ (step S1606). If the condition of $\Delta t_i$>$\Delta t_{th}$ is not satisfied (step S1606: NO), the process returns to step S901.

If $\Delta t_i$>$\Delta t_{th}$ (step S1606: YES), the OS 121 sets $\Delta t_c$ to the timer (step S1607) and determines whether the timer is inactive (step S1608). The setting of $\Delta t_c$ to the timer means that the timer counts the time until $\Delta t_c$ elapses.

If the timer is inactive (step S1608: YES), the OS 121 activates the timer (step S1609). The process returns to step S901. If the timer is not inactive (step S1608: NO), the process returns to step S901.

Figure 17:
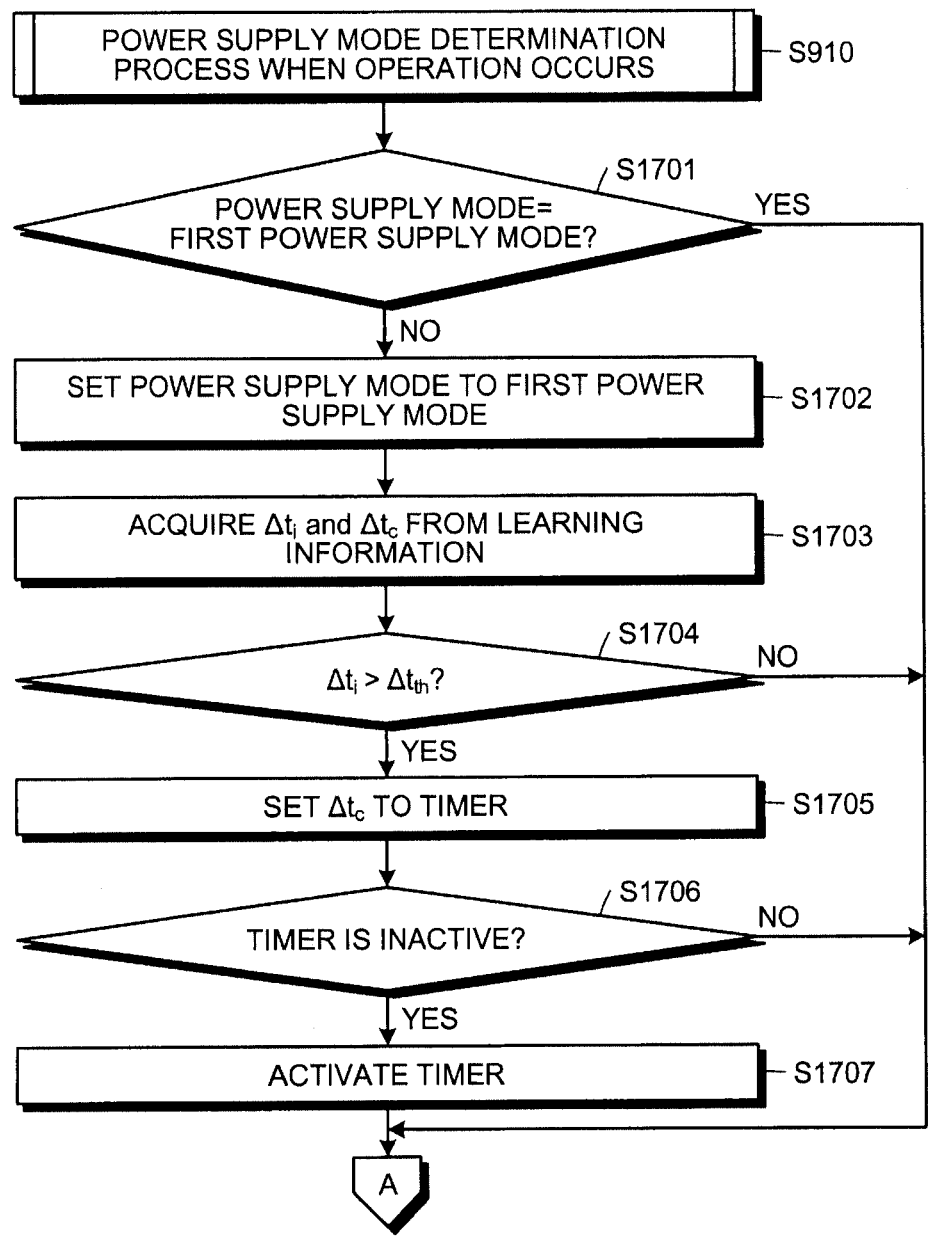
FIG. 17 is a flowchart of the power supply mode determination process (step S910) after a process in FIG. 9.

FIG. 17 is a flowchart of the power supply mode determination process (step S910) after a process in FIG. 9. The OS 121 determines whether the power supply mode is in the first power supply mode (step S1701). If the power supply mode is in the first power supply mode (step S1701: YES), the process returns to step S901.

If the power supply mode is in the first power supply mode (step S1701: NO), the OS 121 sets the power supply mode to the first power supply mode (step S1702). For example, the OS sets 0 to the register concerning the power supply mode and then the power supply mode is set to the first power supply mode. The OS 121 acquires $\Delta t_i$ and $\Delta t_c$ from the learning information corresponding to the time of detection of operation (step S1703) and determines whether $\Delta t_i$>$\Delta t_{th}$ (step S1704). If $\Delta t_i$>$\Delta t_{th}$ (step S1704: YES), the OS 121 sets $\Delta t_c$ to the timer (step S1705) and determines whether the timer is inactive (step S1706).

If the timer is inactive (step S1706: YES), the OS 121 activates the timer (step S1707). The process returns to step S901. If the timer is not inactive (step S1706: NO), the process returns to step S901. If the condition of $\Delta t_i$>$\Delta t_{th}$ is not satisfied in step S1704 (step S1704: NO), the process returns to step S901.

Figure 18:
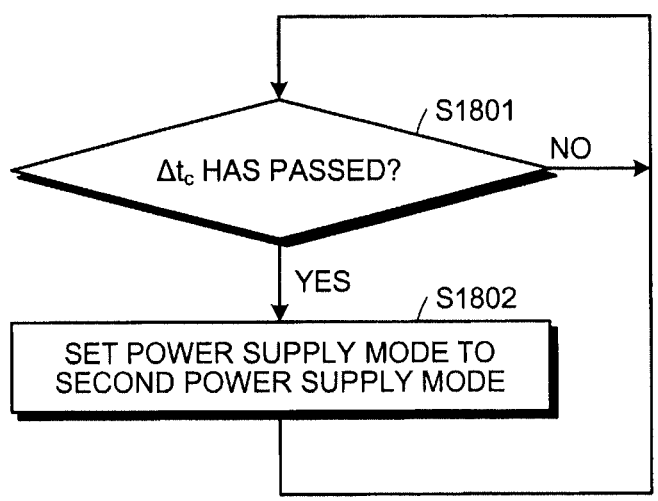
FIG. 18 is a flowchart of the control process after $\Delta t_c$ has passed.

FIG. 18 is a flowchart of the control process after $\Delta t_c$ has passed. The OS 121 determines whether $\Delta t_c$ has passed (step S1801). If $\Delta t_c$ has not passed (step S1801: NO), the process returns to step S1801. If the $\Delta t_c$ has passed (step S1801: YES), the OS 121 sets the power supply mode to the second power supply mode (step S1802). The process returns to step S1801. For example, the OS 121 sets 1 to a register concerning the power supply mode and sets the power supply mode to the second power supply mode.

As set forth above, according to the multiple-core processor system, the control program, and the control method, the operation pattern of a user is analyzed and the timing for switching the power supply modes is dynamically determined. In this way, the power consumption is lowered without degrading the performance of the process concerning the user's operation.

Furthermore, the timing for switching the power supply mode to the second power supply mode, which is the low power consumption mode, is dynamically determined and thus the power conservation is realized.

Furthermore, by analyzing the elapsed time from the detection of the arrival to the detection of an operation, it is dynamically judged whether an operation immediately follows the arrival. When the probability of the operation immediately following the arrival is high, the power supply mode is set to the first power supply mode, which is not the low power consumption mode. In this way, the performance of processes concerning operations is not degraded.

If the power supply mode is in the second power supply mode when the probability of the operation immediately following the arrival is low, the power supply mode is not switched to the first power supply mode, thereby lowering the power consumption.

According to the multiple-core processor system, the control program, and the control method, the power consumption can be reduced without lowering the performance.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multiple-core processor system comprising:
   a memory unit storing for each time bin, a number of time intervals within a time bin in relation to a time segment which includes an end point of a time interval, the number of time intervals being calculated based on a time interval between two consecutive operations; and
   a processor configured to:
      update the number of time intervals,
      specify from the memory unit, a time bin in relation to a time segment which includes a current time, during which the number of time intervals after the update is equal to or below a first threshold, and which comes first from a last operation before switching of a time segment which includes the current time when the time segment which includes the current time is switched,
      set a power supply mode in which the multiple-core processor is supplied with power, to a first power supply mode in which at least two cores are supplied with power when a time bin during which a number of time intervals is equal to or larger than a second threshold is equal to or less than a given time stretch, and
      set to a second power supply mode in which less cores are supplied with power than in the first power supply mode when the time bin during which the number of time intervals is equal to or larger than the second threshold is larger than the given time stretch.

2. The multiple-core processor system according to claim 1, wherein
   the processor switches, when the time interval goes beyond the time stretch, the first power supply mode to a second power supply mode in which less cores are supplied with power than in the first power supply mode.

3. A multiple-core processor system comprising:
   a memory unit storing the number of time intervals within a time bin, a time interval being a time interval between arrival to an apparatus having a multiple-core processor and detection of an operation; and a processor configured to:
update the number of time intervals,
calculate a sum of the numbers of time intervals until a specific time,
determine whether the sum is at least a threshold, and
select, when an arrival is newly detected and the sum is at least the threshold, a first power supply mode among the first power supply mode and a second power supply mode and set a power supply mode to the first power supply mode, the first power supply mode being a mode in which at least two cores are supplied with power and the second power supply mode being a mode in which less cores are supplied with power than in the first power supply mode,
wherein the processor does not change the power supply mode when the arrival is newly detected and the sum is less than the threshold.

4. A non-transitory computer-readable recording medium storing a program causing a core in a multiple-core processor system to execute a process comprising:
storing for each time bin a number of time intervals within a time bin in relation to a time segment which includes an end point of a time interval, the number of time intervals being calculated based on a time interval between two consecutive operations;
updating the number of time intervals;
specifying a time bin in relation to a time segment which includes a current time, during which the number of time intervals after the update is equal to or below a first threshold, and which comes first from a last operation before switching of a time segment which includes the current time when the time segment which includes the current time is switched;
setting a power supply mode in which the multiple-core processor is supplied with power, to a first power supply mode in which at least two cores are supplied with power when a time bin during which a number of time intervals is equal to or larger than a second threshold is equal to or less than a given time stretch, and
setting to a second power supply mode in which less cores are supplied with power than in the first power supply mode when the time bin during which the number of time intervals is equal to or larger than the second threshold is larger than the given time stretch.

5. A control method executed by a multi-core processor, the method comprising:
storing for each time bin a number of time intervals within a time bin in relation to a time segment which includes an end point of a time interval, the number of time intervals being calculated based on a time interval between two consecutive operations;
updating the number of time intervals;
specifying a time bin in relation to a time segment which includes a current time, during which the number of time intervals after the update is equal to or below a first threshold, and which comes first from a last operation before switching of a time segment which includes the current time when the time segment which includes the current time is switched;
setting a power supply mode in which the multiple-core processor is supplied with power, to a first power supply mode in which at least two cores are supplied with power when a time bin during which a number of time intervals is equal to or larger than a second threshold is equal to or less than a given time stretch, and
setting to a second power supply mode in which less cores are supplied with power than in the first power supply mode when the time bin during which the number of time intervals is equal to or larger than the second threshold is larger than the given time stretch.

* * * * *